No. 621,343. Patented Mar. 21, 1899.
H. A. HORTON.
DEVICE FOR RETAINING UNRULY HOGS.
(Application filed Dec. 5, 1898.)

(No Model.)

Witnesses

Inventor

UNITED STATES PATENT OFFICE.

HAZEN A. HORTON, OF TEKONSHA, MICHIGAN, ASSIGNOR OF ONE-HALF TO EDWARD P. KEEP, OF SAME PLACE.

DEVICE FOR RETAINING UNRULY HOGS.

SPECIFICATION forming part of Letters Patent No. 621,343, dated March 21, 1899.

Application filed December 5, 1898. Serial No. 698,402. (No model.)

*To all whom it may concern:*

Be it known that I, HAZEN A. HORTON, a citizen of the United States, residing at Tekonsha, in the county of Calhoun and State of Michigan, have invented a certain new and useful Improvement in Devices for Retaining Unruly Hogs; and I do hereby declare the following to be a full, clear, and exact description of the invention, such as will enable others skilled in the art to which it appertains to make and use the same, reference being had to the accompanying drawings, and to the letters marked thereon, which form a part of this specification.

My invention relates to an improvement for retaining unruly hogs inclosed, and has for its object the construction of a wire device to be attached to the hog's nose and ears by means of rings—such as will especially prevent hogs from passing through, tearing down, or injuring rail, slat, wire, or other fences, gates, or inclosures—to be light and simple in construction, easily applied, and cheap to manufacture.

With these ends in view my invention consists in a certain novel arrangement of construction, as is illustrated in the accompanying drawings and especially referred in the specification and pointed out in the claims.

Figure 1:
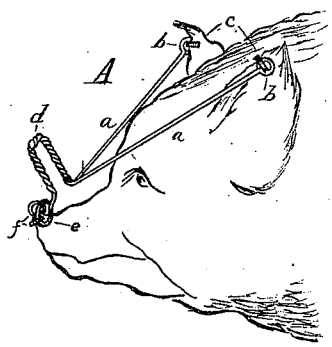
Figure 3:
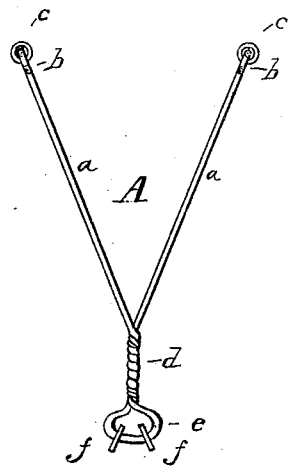
Figure 4:
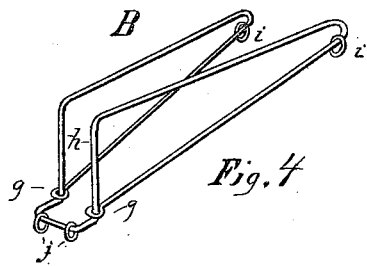
Figure 2:
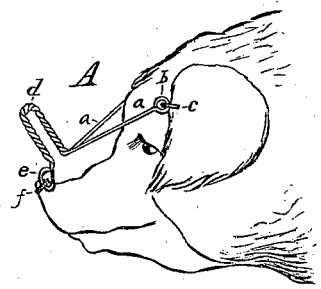

In the drawings, Figure 1 represents the device attached to a hog having its ears fully extended and the device fastened to the ear-tips. Fig. 2 represents the device attached to a hog's ears near the base or lobe. Fig. 3 represents a plan view of the device. Fig. 4 represents a modification in perspective of the device.

A represents the device constructed of wire of suitable size and degree of stiffness to prevent springing or bending out of proper shape and which may be described as representing the letter Y, having its stem twisted and bent to form a curve $d$, which at its lower terminus forms an elongated loop $e$.

The wire A has eyelets $b\,b$ formed at either end, through which rings $c\,c$ pass and engage with the hog's ears at a point where the wings $a\,a$ separate. The wire is twisted upon itself and forms the inverse of the letter U or curve $d$, having the elongated loop $e$ at its terminus, through which rings $f\,f$ pass and engage with the hog's snout.

In the modification in Fig. 4 the wire B forms the letter U, each terminus from the curve bending upward and backward from the curve, thence returning by a downward curve, and terminates with eyelets which engage with the upwardly-bent portions $h\,h$. The rings $i\,i$ engage with the hog's ears and are adapted to work or slide along the lower curve of the wire in accordance to the size of the hog to which the same is applied, the rings working at or near the terminus of the curves on a large animal and nearer the snout on a small or medium-sized one, $j\,j$ being rings which engage the hog's snout, the upwardly-extending portion $h\,h$ answering the purpose of the twisted upright curve $d$ in Figs. 1 and 2.

In placing my device on a hog rings $f\,f$ are passed through the loop $e$ and likewise through the eyelets $b\,b$, the former securing the device to the snout, the latter to the hog's ears, each ear being independently secured by means of the wings $a\,a$. The rings referred to are the ordinary hog-rings commonly employed to prevent hogs from rooting and are applied to the hog's snout and ears with the common hog-ringing apparatus. Should the hog be small or of medium size, the rings would be secured to the ear-tips, as is shown in Fig. 1, while if the hog is large the device could be secured by passing the rings for the ears through the lobes or base thereof. The curve $d$ acts as a stop should the hog endeavor to root or push its snout through or pass between rails, slats, wire, or other material composing a fence, gate, or inclosure.

The device is exceedingly simple and thoroughly effective, and is applicable to breeding-sows, boars, and other swine which oftentimes have to be sold or disposed of at a sacrifice to their owners owing to their intractable proclivities.

Having described my invention, what I claim as new, and desire to secure by Letters Patent, is—

1. A device, for keeping inclosed unruly hogs, composed of wire and formed with a loop, or curve, at one end and adapted to receive rings for securing the same to a hog's snout, and an upwardly-bending portion terminating in two backwardly-extending diverging arms, or wings, each of which is adapted to receive a ring for securing the same to a hog's ear independently, for the purposes set forth.

2. The herein-described device A, having the loop $e$, twisted curve $d$, diverging arms $a, a$, provided at their ends with eyelets $b, b$, the loop $e$ adapted to receive rings for securing it to a hog's snout, and the eyelets $b, b$ adapted to receive rings for securing it to a hog's ears in combination, for the purposes set forth and described.

HAZEN A. HORTON.

Witnesses:
FRANK E. ALLEN,
C. H. CHILDS.